United States Patent [19]
Lew

[11] Patent Number: 5,226,330
[45] Date of Patent: Jul. 13, 1993

[54] HIGH SENSITIVITY MASS FLOWMETER

[76] Inventor: Hyok S. Lew, 7890 Oak St., Arvada, Colo. 80005

[21] Appl. No.: 785,782

[22] Filed: Oct. 31, 1991

[51] Int. Cl.⁵ ............................................. G01F 1/84
[52] U.S. Cl. ............................................. 73/861.37
[58] Field of Search ........................ 73/861.37, 861.38

[56] References Cited

U.S. PATENT DOCUMENTS

| | | | |
|---|---|---|---|
| 2,821,084 | 1/1958 | Altfillisch et al. | 73/861.38 |
| 4,760,744 | 8/1988 | Simonsen | 73/861.38 |
| 4,856,346 | 8/1989 | Kane | 73/861.38 |
| 4,938,075 | 7/1990 | Lew | 73/861.38 |
| 5,024,104 | 6/1991 | Dames | 73/861.37 |
| 5,090,253 | 2/1992 | Kolpak | 73/861.38 |

FOREIGN PATENT DOCUMENTS 0119638  9/1984  European Pat. Off. ......... 73/861.37
0136715  5/1990  Japan ............................. 73/861.38

*Primary Examiner*—Herbert Goldstein

[57] ABSTRACT

A mass flowmeter comprises a pair of conduits disposed in a side by side arrangement and flexurally vibrated relative to one another by an electromagnetic vibrator included at the midsection of the combination of the pair of conduits wherein each of the pair of conduits includes two flexible sections respectively included in the two opposite halves thereof, wherein a pair of relative motion sensors respectively measuring the relative flexural vibration between the first halves of the pair of conduits and the relative flexural vibration between the second halves of the pair of conduits provide two electrical signals including a difference therebetween that varies as a function of mass flow rate of media moving through the pair of conduits.

16 Claims, 3 Drawing Sheets

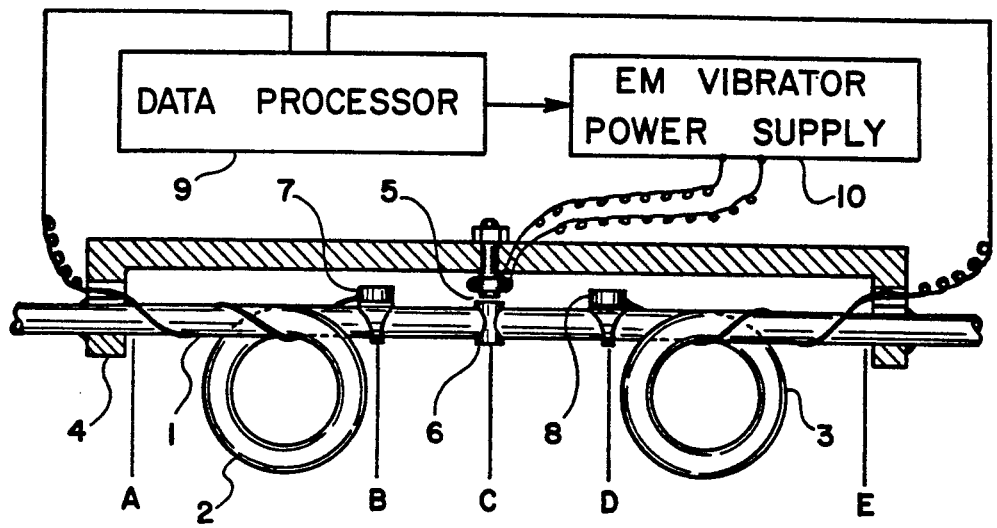
Fig. 1
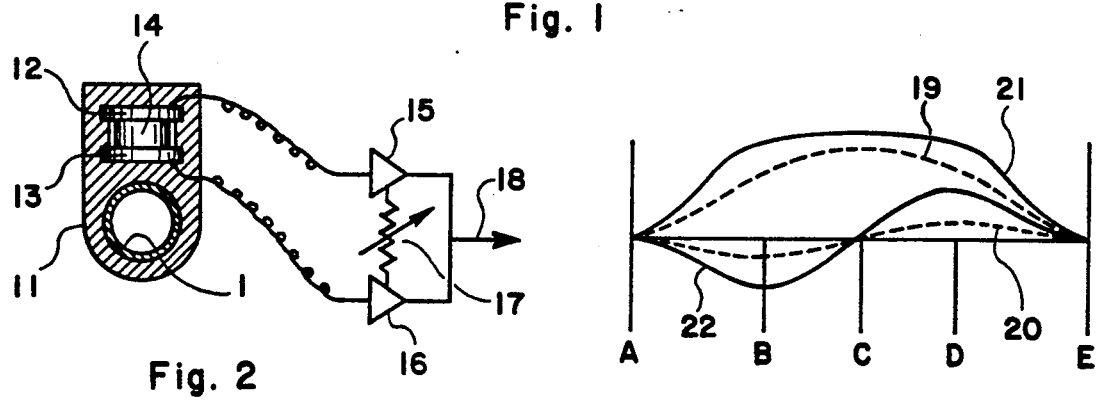
Fig. 2
Fig. 3
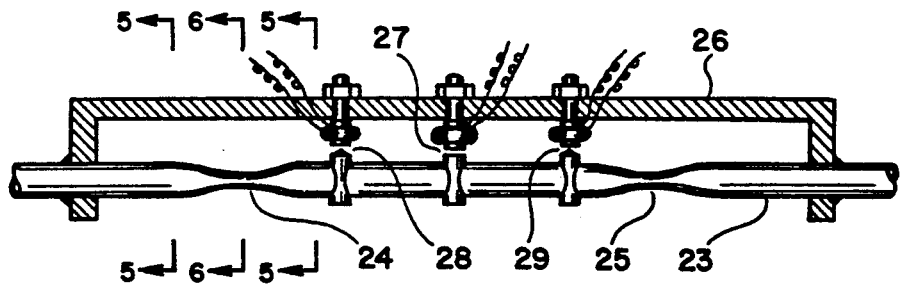
Fig. 4
Fig. 5   Fig. 6

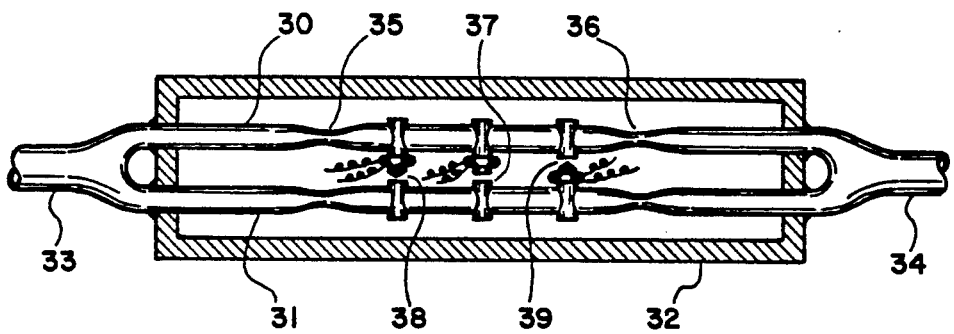
Fig. 7
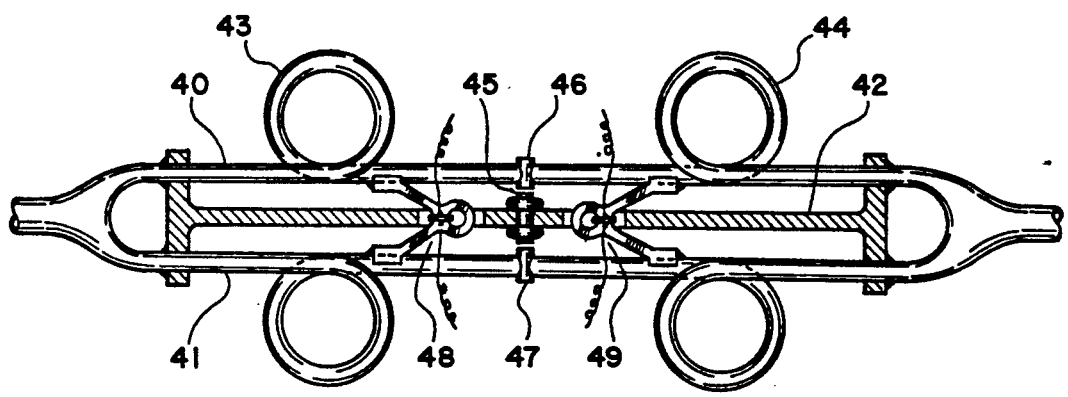
Fig. 8
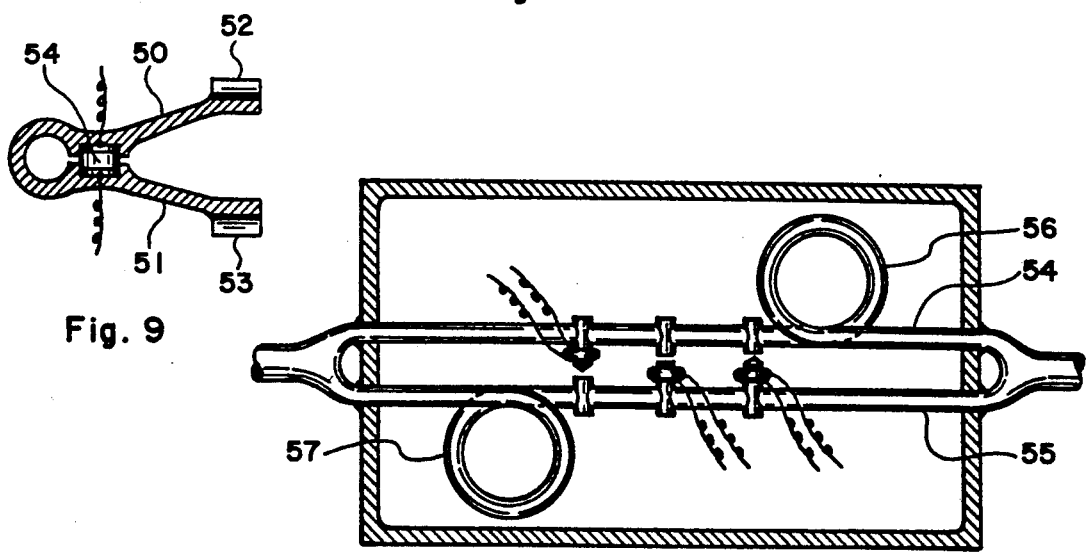
Fig. 9
Fig. 10

HIGH SENSITIVITY MASS FLOWMETER

BACKGROUND OF THE INVENTION

The mass flowmeters known by the name of "Convective inertia force" flowmeter of "Coriolis force" flowmeters, which employ a single or a pair of vibrating conduits, have become very popular among many industrial users, as such mass flowmeters provide a number of advantages for the users, which advantages includes the clean flow passage free of any obstruction, the ability to measure mass flow rates of all kinds of media independent of the viscosity and homogeneity of the media and the high accuracy and high repeatability of the mass flow measurement. On the other hand, the mass flowmeters employing the vibrating conduits available at the present time have a few serious shortcomings such as the poor sensitivity seriously limiting the ability to measure mass flow rates of low magnitude, and the high cost that prevents the truly wide spread use of the mass flowmeters employing the vibrating conduits. Of course, the high cost of these mass flowmeters is a direct manifestation of the poor sensitivity of the mass flowmeters inherent to the existing designs thereof. The convective inertia force generated by media moving through the vibrating conduits of the mass flowmeter is proportional to the mass flow rate of the media times the gradient in the distribution of the flexural vibratory motion of the conduit following the length of the conduit. The mass flow rate is determined by measuring the amplitude of the secondary flexural vibration of the conduit created by the convective inertia force that is generated by the combination of the mass flow of media through the conduit and the primary flexural vibration of the conduit imposed by an electromagnetic vibrator. Therefore, the sensitivity of the inertia force mass flowmeter can be drastically increased when the vibrating conduit constituting the flow passage in the mass flowmeter has a structural design, that provides, firstly, a sharp curvature in the bending mode of the conduit in the primary flexural vibration and secondly, a low stiffness against the secondary flexural vibration. In more plain language, the inertia force mass flowmeter must employ a conduit or conduits having one or more localized section with high flexibility.

BRIEF SUMMARY OF THE INVENTION

The primary object of the present invention is to provide an inertia force mass flowmeter comprising at least one conduit secured at both extremities thereof, which conduit has two localized sections of enhanced flexibility respectively included in the two opposite halves of the conduit, wherein an electromagnetic vibrator exerting a vibratory force to the midsection of the conduit generates the primary flexural vibration, and a pair of motion sensors respectively included in the two opposite halves of the conduit measures the secondary flexural vibration created by an interaction between the mass flow rate of media moving through the conduit and the primary flexural vibration of the conduit, and the mass flow rate of the media is determined as a function of the intensity of the secondary flexural vibration relative to the intensity of the primary flexural vibration.

Another object of the present invention is to provide the inertia force mass flowmeter described in the aforementioned primary object of the present invention, wherein two looped sections of the conduit respectively included in the two opposite halves constitute the two localized sections of enhanced flexibility in the conduit.

A further object of the present invention is to provide the inertia force flowmeter described in the primary object of the present invention, wherein two crimped or flattened sections of the conduit respectively included in the two opposite halves of the conduit constitute the two localized sections of enhanced flexibility in the conduit.

Yet another object of the present invention is to provide an inertia force mass flowmeter comprising a pair of parallel conduits secured at the extremities thereof and flexurally vibrated relative to one another by an electromagnetic vibrator disposed at the midsection of the combination of the pair of conduits, wherein one of the pair of conduits has a section of enhanced flexibility included in the first half of that conduit, while the other of the pair of conduits has a section of enhanced flexibility included in the second half of that conduit opposite to the first half of one of the pair of conduits.

Yet a further object of the present invention is to provide an inertia force flowmeter comprising at least one conduit of flattened cross section secured at the extremities thereof and flexurally vibrated by an electromagnetic vibrator disposed at the midsection thereof, which combination is contained within a container vessel pressurized to a pressure generally counter-balancing the media pressure within the conduit.

Still another object of the present invention is to provide an inertia force flowmeter comprising at least one planar elongated member secured at the extremities thereof and flexurally vibrated by an electromagnetic vibrator disposed at the midsection thereof in directions perpendicular to a plane including the planar elongated member, wherein the planar elongated member includes a plurality of parallel flow passages distributed on a plane perpendicular to the directions of the flexural vibration of the planar elongated member.

These and other objects of the present invention will become clear as the description thereof progresses.

BRIEF DESCRIPTION OF THE FIGURES

The present invention may be described with a greater clarity and specificity by referring to the following figures:

FIG. 1 illustrates an embodiment of the inertia force flowmeter constructed in accordance with the principles of the present invention, that includes a vibrating conduit with two looped sections respectively disposed in the opposite halves thereof.

FIG. 2 illustrates a cross section of an accelerometer type motion sensor usable in constructing the inertia force flowmeter of the present invention.

FIG. 3 illustrates the comparison of the bending modes of the vibrating conduit between a straight conduit with uniform cross section and a conduit with two localized sections of enhanced flexibility.

FIG. 4 illustrates another embodiment of the inertia force flowmeter of the present invention employing a vibrating conduit with two localized crimped or flattened sections respectively disposed in the two opposite halves thereof.

FIG. 5 illustrates a cross section of the conduit employed in the embodiment shown in FIG. 4, whereat the conduit is not crimped or flattened.

FIG. 6 illustrates another cross section of the conduit employed in the embodiment shown in FIG. 4, whereat the conduit is crimped or flattened in order to provide an enhanced flexibility thereat.

FIG. 7 illustrates a further embodiment of the inertia force flowmeter of the present invention comprising a pair of conduits vibrated relative to one another, wherein each of the pair of conduits includes two crimped or flattened sections respectively disposed in the two opposite halves thereof.

FIG. 8 illustrates yet another embodiment of the inertia force flowmeter of the present invention comprising a pair of conduits vibrated relative to one another, wherein each of the pair of conduits includes two looped sections respectively disposed in the two opposite halves thereof.

FIG. 9 illustrates a relative motion sensor usable in constructing the inertia force flowmeter of the present invention.

FIG. 10 illustrates a modified version of the inertia force flowmeter shown in FIG. 8.

DESCRIPTION OF THE ILLUSTRATED EMBODIMENTS

Figure 11:
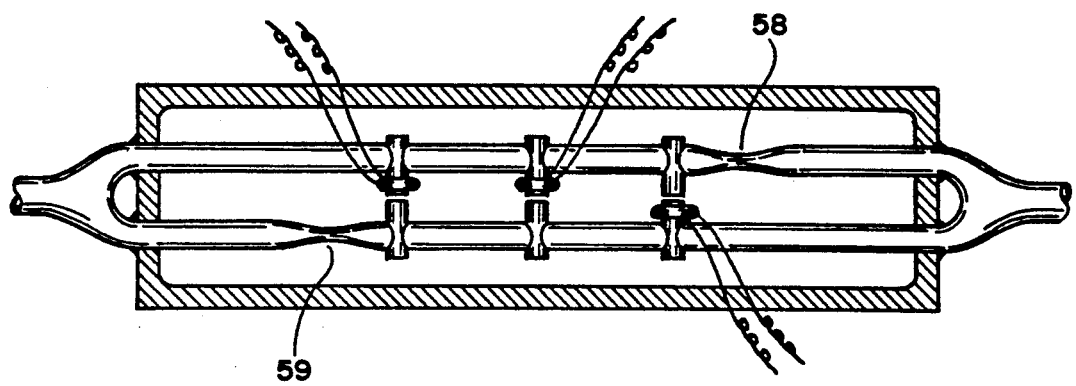
FIG. 11 illustrates a modified version of the inertia force flowmeter shown in FIG. 7.

In FIG. 1 there is illustrated an embodiment of the mass flowmeter of the present invention, that comprises a single conduit 1 with two looped sections 2 and 3 respectively disposed in the two opposite halves of the conduit 1, which conduit is secured to a rigid support structure 4 at the two extremities thereof and flexurally vibrated on a plane including the two looped sections 2 and 3 by an electromagnetic vibrator 5 exerting a vibratory force to the midsection of the conduit 1 at a desired frequency, that is selected generally equal to the natural frequency of flexural vibration of the conduit. A pair of motion sensors 7 and 8 respectively disposed at the two opposite halves of the conduit 1 in a symmetric arrangement about the midsection of the conduit 1 measures the flexural vibrations of the two opposite halves of the conduit 1. In the particular illustrative embodiment, the motion sensor 7 or 8 is disposed intermediate the respective looped section 2 or 3 of the conduit 1 and the midsection of the conduit 1. In an alternative design, each of the motion sensors may be disposed intermediate the respective looped section of the conduit and the anchored extremity adjacent to the looped section of the conduit. The data processor 9 receiving electrical signals representing the flexural vibrations of the two opposite halves of the conduit 1 from the two motion sensors 7 and 8 determines the mass flow rate of media moving through the conduit 1 as a function of difference, e.g., asymmetry, in the mode of flexural vibrations of the conduit 1 between the two opposite halves thereof. The power supply 10 energizing the electromagnetic vibrator 5 with an alternating electric current may receive information on the natural frequency of the flexural vibration of the conduit 1 from the data processor 9, whereby the power supply 10 energizes the electromagnetic vibrator 5 at a frequency equal to the natural frequency of the flexural vibration of the conduit 1.

In FIG. 2 there is illustrated a cross section of an embodiment of the motion sensor usable in constructing the mass flowmeter of the present invention which cross section is taken along a plane perpendicular to the central axis of the flow passage provided by the conduit 1. The motion sensor 7 or 8 comprises a rigid body 11 affixed to the conduit 1, which body includes a pair of piezo electric disc elements 12 and 13 rigidly affixed to the body 11 and sandwiching a disc shaped mass element 14 therebetween. The flexural vibration of the conduit in directions perpendicular to a plane parallel to the piezo electric disc elements 12 and 13 generates an inertia force of the mass element 14, that compresses one of the two piezo electric disc elements 12 and 13 and decompresses the other thereof in an alternating mode. The two electrical signals respectively generated by the two piezo electric elements 12 and 13 are combined by a pair of amplifiers 15 and 16 respectively receiving the electrical signals from the two piezo electric disc elements 12 and 13, which pair has a signal level balancing means 17, in such a way that noise generated by irregular vibrations is cancelled therebetween and an alternating sinusoidal signal 18 representing the flexural vibration of each half of the conduit 1 is obtained. It should be understood that the piezo electric accelerometer type motion sensor shown in FIG. 2 may be replaced by other types of motion sensors such as the magnetic induction type motion sensors employed in the construction of the embodiment of the mass flowmeters shown in FIG. 4, or by the piezo electric relative motion sensors employed in the construction of the embodiment of the mass flowmeter shown in FIG. 8, or by other types of motion sensors well known in the art of vibration measurements.

In FIG. 3, there is illustrated the operating characteristics of the present invention represented by the embodiment shown in FIG. 1. The broken line 19 represents the mode of flexural vibration of the central axis of a straight conduit without any looped sections, that is secured to a rigid support structure at the two extremities "A" and "B" thereof, which conduit contains stationary media and is vibrated by an electromagnetic vibrator disposed at the midsection "C" of the conduit. It is readily recognized that the broken line 19 represents the mode of primary flexural vibration of the conduit produced by the electromagnetic vibrator disposed at the midsection "C" of the conduit, that is symmetric about the midsection "C" of the conduit. The media moving through the conduit dynamically interacts with the primary flexural vibration of the conduit, that is symmetrical about the midsection of the conduit as shown by the broken line 19, and produces the second flexural vibration of the conduit, that is antisymmetric about the midsection of the conduit as shown by the broken line 20. As the straight conduit without any looped sections has a continuous stiffness along the length thereof, the flexural deflection modes of the straight conduit has a smooth distribution along the length thereof as represented by the broken lines 19 and 20, and has a relatively small maximum value. The mass flow rate of media moving through the conduit is directly propertional to the ratio of the amplitude of the antisymmetric secondary flexural vibration represented by the broken line 20 to the amplitude of the symmetric primary flexural vibration represented by the broken line 19. In general, the convective inertia force of the media moving through the conduit resulting from the primary flexural vibration of the conduit is limited to small magnitudes because of the relatively small amplitude of the primary flexural vibration of the conduit, and the straight conduit without any looped sections and with a strong wall to withstand the pressure of the media contained therein has a quite high stiffness against any flexural deflection of the conduit. As a consequence, the antisymmetric secondary flexural vibration represented by the broken line 20 has very small amplitude, which is the exact reason why a mass flowmeter employing a single or a pair of straight conduit with a cross section of uniform circular cylindrical shell has very poor sensitivity and is not able to measure the mass flow rates of any gaseous media as well as the mass flow rates of liquid media moving at low velocities. When the straight conduit is provided with a pair of looped sections 2 and 3 as exemplified by the conduit shown in FIG. 1, the flexural vibration of the central axis of the straight portions of such a conduit is represented by the solid line 21, that represents the symmetric primary flexural vibration thereof, and the solid line 22, that represents the antisymmetric secondary flexural vibration thereof. The amplitude of the flexural vibration of such a conduit with enhanced localized flexibility, particularly the amplitude of the antisymmetric secondary flexural vibration thereof, drastically increases due to the localized flexibility of the conduit. As the amplitude of the antisymmetric secondary flexural vibration of a conduit with a pair of localized flexible sections respectively included in the two opposite halves of the conduit can easily attain a value two to four times greater than that of the straight conduit with uniform stiffness, the mass flowmeter employing the conduit with such an enhanced flexibility has sensitivity equal to 200 to 400 percent of the mass flowmeter employing a straight conduit with high uniform stiffness, which clearly demonstrates the break through accomplished by the present invention in improving the sensitivity of the mass flowmeter employing the vibrating conduit. The amplitude ratio of the secondary flexural vibration to the primary flexural vibration of the conduit, that is proportional to the mass flow rate of media moving through the conduit, can be measured by a number of different method. For example, the amplitude ratio can be determined by measuring the phase angle difference in the flexural vibration of the conduit between the two vibratory motions respectively measured by two motion sensors respectively disposed at the sections "B" and "D" of the conduit, or by taking the difference between the two vibratory motions between the sections "B" and "D" divided by the sum thereof, or by taking the ratio of two measurements of the flexural vibration detected by the motion sensor located at the section "B" at two different instances when the motion sensor located at the section "D" respectively registers zero and peak value of the vibratory motion, or by other methods being practiced at the present time and well known to those skilled in the art.

In FIG. 4, there is illustrated another embodiment of the mass flowmeter of the present invention, that employs a single conduit 23 with a pair of localized crimped partially flattened sections 24 and 25 respectively included in the two opposite halves of the conduit 23, that is rigidly secured to a support structure 26 at the two extremities thereof. The electromagnetic vibrator 27 exerts a vibratory force to the midsection of the conduit 23, and a pair of magnetic induction type motion sensors 28 and 29 respectively disposed at the two opposite halves of the conduit 23 in a symmetric arrangement about the midsection of conduit provide the two electrical signals representing the flexural vibration of the conduit, which two signals are used to determine the mass flow rate by the methods described in conjunction with FIG. 3. As the moment of inertia of the cross section of the conduit is proportional to the fourth power of the cross sectional dimension of the conduit in directions of the flexural vibration of the conduit, the crimped or flattened cross section wherein the circular cylindrical shell cross section is crimped or flattened to one half of the original cross sectional dimension has stiffness now reduced by 16 times from the original stiffness of the conduit. It is readily recognized that the embodiment shown in FIG. 4 employing a conduit with crimped or partially flattened cross section provides a more desirable structural embodiment of the conduit compaired with the embodiment shown in FIG. 1, as the former provides the same end result as that of the latter without employing the bulky looping sections of the conduit. Of course, the magnetic induction type motion sensors 28 and 29 may be replaced by the accelerometer type motion sensors shown in FIG. 2 or by the piezo electric relative motion sensors shown in FIG. 9.

In FIG. 5 there is illustrated a cross section of the conduit 23 employed in the mass flowmeter shown in FIG. 4, which cross section taken along plane 5—5 as shown in FIG. 1 shows the circular cylindrical shell cross section of the uncrimped portion of the conduit 23.

In FIG. 6 there is illustrated another cross section of the conduit 23 employed in the mass flowmeter shown in FIG. 4, which cross section taken along plane 6—6 as shown in FIG. 4 shows an oblated cross sectional geometry of the conduit 23 at the crimped or partially flattened sections 23 or 25.

In FIG. 7 there is illustrated a further embodiment of the mass flowmeter of the present invention, that employs a pair of substantially straight conduits 30 and 31 disposed in a parallel arrangement therebetween and rigidly secured to a support structure 32 at the extremities thereof, which two conduits 30 and 31 have a common inlet 33 and a common outlet 34. Each of the two straight conduits 30 and 31 includes two crimped or partially flattened sections 35 and 36 as described in conjunction with the conduit 23 included in the embodiment shown in FIG. 4. An electromagnetic vibrator 37 disposed at the midsection of the combination of the two conduits 30 and 31 flexurally vibrates the two conduits relative to one another. A pair of motion sensors 38 and 39 respectively included in the two opposite halves of the combination of the conduits 30 and 31 measures the relative flexural vibrations between the two conduits at the two opposite halves of the combination of the conduit. The mass flow rate of media entering through the inlet 33 and exiting through the outlet 34 is determined by the method described in conjunction with FIG. 3. In place of the magnetic induction type relative motion sensors 38 and 39, the piezo electric type relative motion sensors shown in FIG. 9 may be employed in constructing the mass flowmeter shown in FIG. 7.

In FIG. 8 there is illustrated yet another embodiment of the mass flowmeter of the present invention, that employs a pair of conduits 40 and 41 secured to a rigid support structure 42 at the extremities thereof, which two conduits have a common inlet and outlet. Each of the two conduits 40 and 41 includes two looped sections 43 and 44 as described in conjunction with the conduit 1 included in the embodiment shown in FIG. 1. An electromagnetic vibrator 45 anchored to the support structure 42 intermittently pulls the ferromagnetic targets 46 and 47 respectively affixed to the midsections of the two conduits 40 and 41, and consequently creates a relative flexural vibration between the two conduits. A pair of piezo electric relative motion sensors 48 and 49 respectively measures the relative flexural vibration between the two conduits 40 and 41 at the two opposite halves of the combination of the two conduits. The mass flow rate of the media is determined by the method described in conjunction with FIG. 3. Of course, the piezo electric type relative motion sensors 48 and 49 may be replaced with the magnetic induction type relative motion sensors employed in the embodiment shown in FIG. 7.

In FIG. 9 there is illustrated an embodiment of the piezo electric type motion sensor employed in the construction of the mass flowmeter shown in FIG. 8. A pair of elongated members 50 and 51 with extremities 52 and 53 respectively including means for anchoring to the two conduits vibrated relative to one another converges to one another at the opposite extremities thereof and structurally connect to one another. At least one piezo electric disc element 54 is disposed intermediate the two elongated members 50 and 51 in a squeezed arrangement intermediate the two extremities of the combination of the elongated members 50 and 51. The piezo electric disc element generates an alternating electrical signal as the pressure exerted thereon by the pair of elongated members 50 and 51 fluctuates due to the relative motion between the extremities of the two elongated members 50 and 51.

In FIG. 10 there is illustrated yet a further embodiment of the mass flowmeter of the present invention, that is a modified version of the embodiment shown in FIG. 8. Each of the two conduits 54 or 55 includes a single looped section 56 or 57 in an arrangement wherein the two looped sections respectively belonging to the two conduits 54 and 55 are respectively disposed on the two opposite sides of the midsection of the combination of the conduit. It should be noticed that, while each of the two conduits 54 and 55 does not have a symmetric construction about the midsection thereof, the combination of the two conduits has a structural arrangement that is symmetric about the midsection of the combination of the two conduits. The mass flow rate is determined by the method described in conjunction with FIG. 3. It should be mentioned that, as an alternative in design, the looped sections of the conduits included in the embodiments shown in FIGS. 1, 8 and 10 may be disposed on a plane perpendicular to the direction of the flexural vibration of the conduits.

In FIG. 11, there is illustrated still another embodiment of the mass flowmeter of the present invention, that is a modified version of the embodiment shown in FIG. 7, which embodiment results in when the looped sections 56 and 57 of the conduits are replaced by crimped or partially flattened sections 58 and 59 of the conduit.

Figure 12:
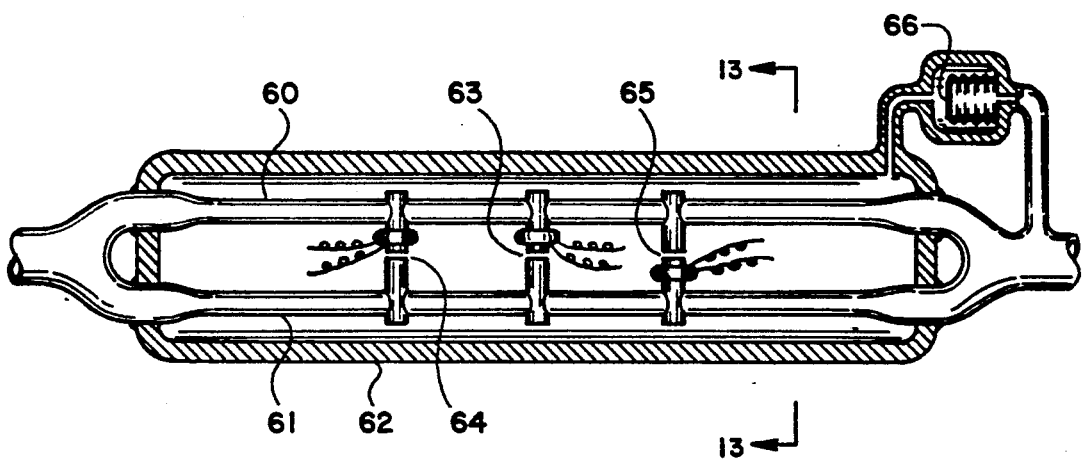
FIG. 12 illustrates yet a further embodiment of the inertia force flowmeter of the present invention, that comprises a pair of conduits with a flattened cross section contained within a pressurized container vessel, wherein the pair of flattened conduits are flexurally vibrated relative to one another.

In FIG. 12 there is illustrated still a further embodiment of the mass flowmeter of the present invention, that employs a pair of conduits 60 and 61, which have crimped or partially flattened cross section over entire lengths thereof intermediate the extremities secured to a rigid support structure forming part of the pressurized enclosure vessel 62 housing the pair of conduits 60 and 61, the electromagnetic vibrator 62, and the pair of motion sensors 63 and 64 therein. As a conduit of noncircular tubular construction is not capable of containing the pressure of media contained therein, the interior space of the enclosure vessel 62 is pressurized by a gaseous medium contained therein and compressed by a bellow type barrier 66 that transmits the pressure of the media moving through the conduits 60 and 61 without allowing the mixing between the media in the conduits and the gaseous media contained in the enclosure vessel 62.

Figure 13:
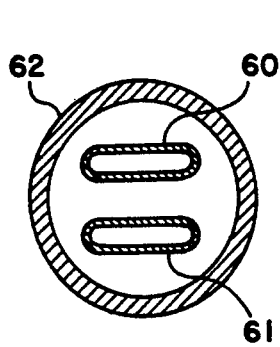
FIG. 13 illustrates a cross section of the embodiment shown in FIG. 12.

In FIG. 13 there is illustrated a cross section of the embodiment shown in FIG. 12, which cross section taken along plane 13—13 as shown in FIG. 12 shows the pair of conduits 60 and 61 having oblated tubular cross sections and the container vessel 62 having a circular cylindrical shell cross section. When the media moving through the conduits 60 and 61 is a liquid medium, the pressure transmitting bellow 66 without mixing the media thereacross should be employed in pressurizing the interior space of the enclosure vessel 62 to the pressure equal to the media pressure contained in the conduits 60 and 61, and consequently, the conduits 60 and 61 must have completely closed walls without any pressure vent holes disposed through the wall of the conduits. However, when the media moving through the conduits 60 and 61 is gaseous media, one or more vent hole can be disposed through the wall of one or both conduits 60 and 61, whereby the gaseous media moving through the conduits 60 and 61 automatically fills up the interior space of the enclosure vessel 62 to the equilibrium pressure.

Figure 14:
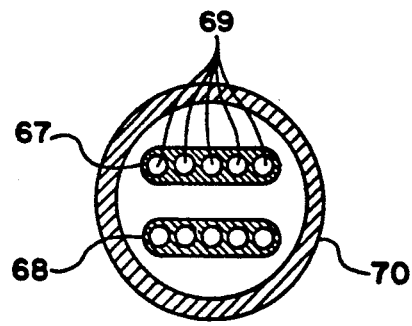
FIG. 14 illustrates still another embodiment of the inertia force flowmeter of the present invention, that comprises a pair of planar elongated members vibrated relative to one another, wherein each of the planar elongated members includes a plurality of flow passages distributed on a plane perpendicular to the directions of flexural vibration thereof.

In FIG. FIG. 14 there is illustrated an embodiment of the mass flowmeter operating on the same principles as those of the embodiments shown in FIGS. 12 and 13 without requiring the pressurization of the interior space of the container vessel 62. This embodiment employs a pair of elongated members 67 and 68 with oblong cross section replacing the conduits 60 and 61 of partially flattened tubular cross section. Each of the two elongated planar members 67 and 68 includes a plurality of flow passages 69 commonly connected to a common inlet and a common outlet and distributed on a plane perpendicular to the directions of the relative flexural vibration between the two elongated members 67 and 68, which arrangement of the flow passages provides sufficient strength to withstand the media pressure contained in the flow passages 69 and yet provides a high flexibility allowing required flexural vibration thereof. As a consequence, the enclosure vessel 70 is not required in general. However, the enclosure vessel 70 may be included and the interior space thereof may be partially or fully evacuated in order to facilitate the undamped relative flexural vibrations of the two elongated members 67 and 68, which measure may be required in view that the elongated member 67 and 68 have a broad side surfaces subjected to high drag forces.

While the principles of the present invention have now been made clear by the illustrative embodiments, there will be many modifications of the structures, arrangements, proportions, elements and materials, which are obvious to those skilled in the art and particularly adapted to the specific working environments and operating conditions in the practice of the invention without departing from those principles. It is not desired to limit the invention to the illustrated embodiments shown and described and accordingly, all suitable modifications and equivalents may be regarded as falling within the scope of the invention as defined by the claims which follow.

The embodiments of the invention, in which an exclusive property or priviledge is claimed, are defined as follows:

1. An apparatus for measuring mass flow rate of media comprising in combination:
   a) a pair of conduits disposed on a common plane defined by central axes of the pair of conduits in an approximately parallel relationship therebetween, and connected to a common inlet at first extremities thereof and connected to a common outlet at second extremities thereof; said pair of conduits secured to a support at two opposite end sections thereof; wherein one of the pair of conduits includes a 360 degree loop disposed on said common plane intermediate a midsection and one of said two opposite secured end sections thereof, and the other of the pair of conduits includes a 360 loop disposed on said common plane intermediate a midsection and the other of said two opposite secured end sections thereof; and said two 360 degree loops respectively included in the pair of conduits are disposed in a rotationally symmetric geometry about an axis of symmetry perpendicular to said common plane and extending through a space intermediate the pair of conduits;
   b) means for exerting a vibratory force to the pair of conduits at the midsections thereof in directions parallel to said common plane, said vibratory force generating a relative flexural vibration between the pair of conduits in directions parallel to said common plane; and
   c) first means for measuring the relative flexural vibration between first halves of the pair of conduit, and second means for measuring the relative flexural vibration between second halves of the pair of conduit, wherein said first and second means for measuring the flexural vibration respectively provide two alternating electrical signals including a difference therebetween that varies as a function of mass flow rate of media moving through at least one of the pair of conduits.

2. An apparatus as defined in claim 1 wherein said combination includes means for determining the mass flow rate of media as a function of difference between the two alternating electrical signals.

3. An apparatus as defined in claim 1 wherein said one of the pair of conduits includes another 360 degree loop disposed on said common plane intermediate the midsection and the other of said two opposite secured end sections thereof, and said the other of the pair of conduits includes another 360 degree loop disposed on said common plane intermediate the midsection and one of said two opposite secured end sections thereof; wherein said 360 degree loops are disposed in a symmetric geometry about a first plane of symmetry located intermediate the pair of conduits and perpendicular to said common plane and about a second plane of symmetry intersecting the midsections of the pair of conduits in a perpendicular relationship.

4. An apparatus as defined in claim 3 wherein said combination includes means for determining the mass flow rate of media as a function of difference between the two alternating electrical signals.

5. An apparatus for measuring mass flow rate of media comprising in combination:
   a) a pair of conduits with circular cross section disposed on a common plane in an approximately parallel relationship therebetween, and connected to a common inlet at first extremities thereof and connected to a common outlet at second extremities thereof; said pair of conduits secured to a support at two opposite end sections thereof; wherein one of the pair of conduits includes a short section having oblong cross section disposed intermediate a midsection and one of said two opposite secured end sections thereof and the other of the pair of conduits includes a short section having oblong cross section disposed intermediate a midsection and the other of said two opposite secured end sections thereof, and said two short sections with oblong cross section respectively included in the pair of conduits are disposed in a rotationally symmetric arrangement about an axis of symmetry perpendicular to said common plane and extending through a space intermediate the pair of conduits, and the oblong cross section of said short sections of the pair of conduits disposed in a relationship wherein minor diametrical axes thereof are parallel to said common plane; whereby said short sections of the pair of conduit with oblong cross section facilitate bending of the pair of conduits in directions parallel to said common plane;
   b) means for exerting a vibratory force to the pair of conduits at the midsections thereof in directions parallel to said common plane, said vibratory force generating a relative flexural vibration between the pair of conduits in directions parallel to said common plane; and
   c) first means for measuring the relative flexural vibration between first halves of the pair of conduit, and second means for measuring the relative flexural vibration between second halves of the pair of conduit, wherein said first and second means for measuring the flexural vibration respectively provide two alternating electrical signals including a difference therebetween that varies as a function of mass flow rate of media moving through at least one of the pair of conduits.

6. An apparatus as defined in claim 5 wherein said combination includes means for determining the mass flow rate of media as a function of difference between the two alternating electrical signals.

7. An apparatus as defined in claim 5 wherein said one of the pair conduits includes another short section having oblong cross section disposed intermediate the midsection and the other of said two opposite secured end sections thereof, and said the other of the pair of conduits includes another short section having oblong cross section disposed intermediate the midsection and one of said two opposite secured end sections thereof, wherein said short sections of the pair of conduits having oblong cross section are disposed in a symmetric geometry about a first plane of symmetry located intermediate the pair of conduits and perpendicular to said common plane and about a second plane of symmetry intersecting with the midsections of the pair of conduits in a perpendicular relationship.

8. An apparatus as defined in claim 7 wherein said combination includes means for determining the mass flow rate of media as a function of difference between the two alternating electrical signals.

9. An apparatus for measuring mass flow rate of media comprising in combination:
   a) a pair of straight conduits with oblong cross section disposed in a parallel relationship therebetween, and connected to a common inlet at first extremities thereof and connected to a common outlet at second extremities thereof; wherein minor diametric axes of the oblong cross section of the pair of conduits are disposed parallel to a plane defined by central axes of the pair of conduits, and the pair of conduits are secured to a support at two opposite end sections thereof;
   b) a container vessel with a pressurized interior enclosing at least sections of the pair of conduit located intermediate the two opposite secured end sections thereof;
   c) means for exerting a vibratory force to the pair of conduits at the midsections thereof in directions parallel to the plane defined by the central axes of the pair of conduit, said vibratory force generating a relative flexural vibration between the pair of conduits in directions parallel to the plane defined by the central axes of the pair of conduits; and
   d) first means for measuring the relative flexural vibration between first halves of the pair of conduit, and second means for measuring the relative flexural vibration between second halves of the pair of conduit, wherein said first and second means for measuring the flexural vibration respectively provide two alternating electrical signals including a difference therebetween that varies as a function of mass flow rate of media moving through at least one of the pair of conduits.

10. An apparatus as defined in claim 9 wherein said combination includes means for determining the mass flow rate of media as a function of difference between the two alternating electrical signals.

11. An apparatus as defined in claim 9 wherein said combination includes means for pressurizing the interior of said container vessel to a value approximately equal to pressure contained in at least one of the pair of straight conduits.

12. An apparatus as defined in claim 11 wherein said combination includes means for determining the mass flow rate of media as a function of difference between the two alternating electrical signal.

13. An apparatus for measuring mass flow rate of media comprising in combination:
   a) an elongated member with oblong cross section including a plurality of flow passages disposed in a side-by-side parallel relationship on a single plane defined by central axes of said plurality of flow passages, said elongated member secured to a support at two opposite end sections thereof; wherein said plurality of flow passages are connected to a common inlet at first extremities thereof and connected to a common outlet at second extremities thereof;
   b) means for exerting a vibratory force to said elongated member at a midsection thereof in directions perpendicular to said plane defined by the central axes of the plurality of flow passages, said vibratory force generating a flexural vibration of the elongated member in directions perpendicular to said plane defined by the central axes of the plurality of flow passages; and
   c) first means for measuring the flexural vibration of the elongated member at a first section thereof intermediate the midsection and one of said two opposite secured end sections thereof, and second means for measuring the flexural vibration of the elongated member at a second section thereof intermediate the midsection and the other of said two opposite secured end sections thereof, wherein said first and second means for measuring the flexural vibration respectively provide two alternating electrical signals including a difference therebetween that varies as a function of mass flow rate of media moving through the plurality of flow passages.

14. An apparatus as defined in claim 13 wherein said combination includes means for determining the mass flow rate of media as a function of difference between the two alternating electrical signals.

15. An apparatus as defined in claim 13 wherein said combination includes another elongated member with oblong cross section including a plurality of flow passages disposed on a single plane defined by central axes of said plurality of flow passages and assembled into a construction identical to the construction of said an elongated member, said another elongated member disposed next to said an elongated member in a parallel and spaced relationship and secured to the support at two opposite end sections thereof in a symmetric arrangement about a plane of symmetry located intermediate said an and another elongated member in a parallel relationship to said two single planes respectively defined by the central axes of the plurality of flow passages included in said a and another elongated members and the oblong cross sections of said a and another elongated member disposed parallel to and symmetrically about said plane of symmetry, and the plurality of flow passages included in said another elongated member also connected to the common inlet at first extremities thereof and connected to the common outlet at second extremities thereof; wherein said means for exerting vibratory force exerts a vibratory force to said an and another elongated member at the midsections thereof in two opposite directions perpendicular to said plane of symmetry and generates a relative flexural vibration between said an and another elongated member in directions perpendicular to said plane of symmetry, and said first and second means for measuring the flexural vibration measure the relative flexural vibration between said an and another elongated member respectively at a first section intermediate the midsection and one of said two opposite secured end sections thereof and at a second section intermediate the midsection and the other of said two opposite secured end sections thereof.

16. An apparatus as defined in claim 15 wherein said combination includes means for determining mass flow rate of media as a function of difference between the two alternating electrical signals.

* * * * *